Sept. 9, 1958  E. L. HOFF  2,851,312
ADJUSTABLE AND COLLAPSIBLE MECHANIC'S STEP
Filed Oct. 15, 1956

INVENTOR.
EDWIN L. HOFF
BY James L. Givnan
ATT'Y

United States Patent Office 2,851,312
Patented Sept. 9, 1958

2,851,312

ADJUSTABLE AND COLLAPSIBLE MECHANIC'S STEP

Edwin L. Hoff, Kennewick, Wash.

Application October 15, 1956, Serial No. 615,919

1 Claim. (Cl. 304—15)

This invention relates to improvements in steps or supports adapted to be detachably engaged with either front wheel of a truck or similar vehicle for support thereby, and when so supported to provide a step or steps at convenient elevation and on which a mechanic can stand and reach into the engine compartment of the vehicle to do such work as may be necessary or desired on the engine or other parts of the vehicle.

Other objects and advantages will appear as the invention is more fully hereinafter described in the following specification, illustrated in the accompanying drawing, and finally pointed out in the appended claims.

Figure 1:
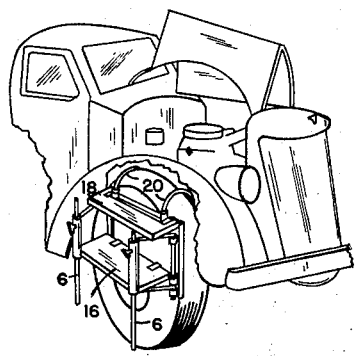
Figure 1 is a fragmentary perspective view of the forward end of a vehicle on a reduced scale showing an adjustable and collapsible mechanic's step made in accordance with my invention and applied to the right front wheel of the vehicle.

Referring now more particularly to the drawing:

The invention comprises two identical side frames indicated generally by reference numerals 1 and 2. Each frame is made up of parallel top and bottom cross members 3 and 4, respectively, each secured at its outer end by welding or the like to a hollow vertical post 5 by means of which the outer end of the frame is vertically adjustable on a leg 6 and lockable thereto in any vertically adjusted position by means of a thumbscrew 7. The opposite ends of the cross members 3 and 4 are similarly secured to parallel vertical posts 8 which are hingedly attached by means of bearing brackets 10 and 11, respectively, to corner posts 12 and 13, respectively, which are interconnected across their top ends by a cross member 14 and near their bottom ends by means of a cross member 15.

A bottom step 16 is provided at its rear edge with laterally spaced apart brackets 17 by means of which the step is hingedly attached to the bottom cross member 15 of the back frame between the side frames. A top step 18 is similarly attached by means of brackets 19 to the top cross member 14 of the back frame. For attaching the frames and steps as a unit to the tire of a vehicle, I provide a pair of hook members 20 each slidably attached to the top cross member 14 of the back frame and also swingable with respect thereto in a vertical plane by means of sleeves 21 each provided with a vertical bearing 22 within which one leg of the hook element is pivotally attached for movement in a horizontal plane and lockable with respect to the bearing by means of thumbscrews 23.

Figure 2:
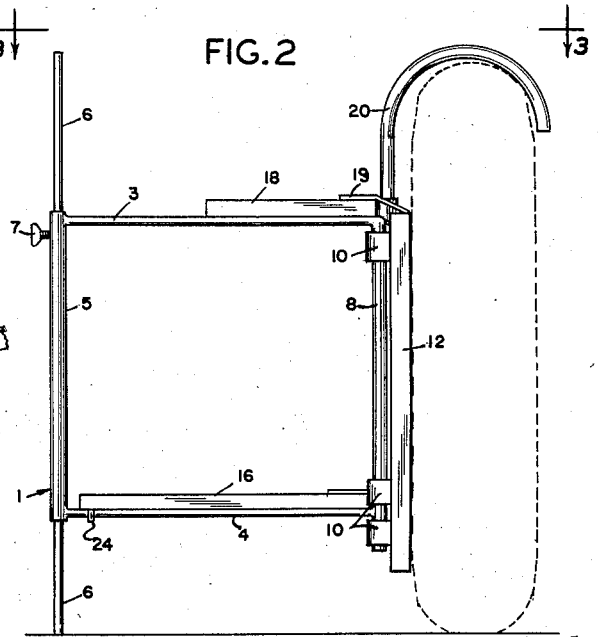
Figure 2 is a view on an enlarged scale of the right-hand end of the device as shown in Figure 1 removed from the vehicle.
Figure 5:
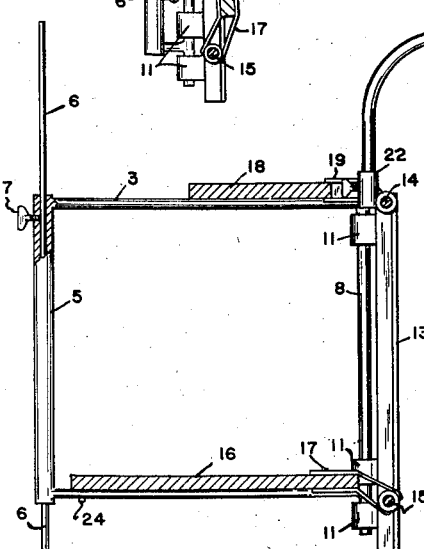
Figure 5 is a view similar to Figure 4 showing the invention in folded compact form.
Figure 3:
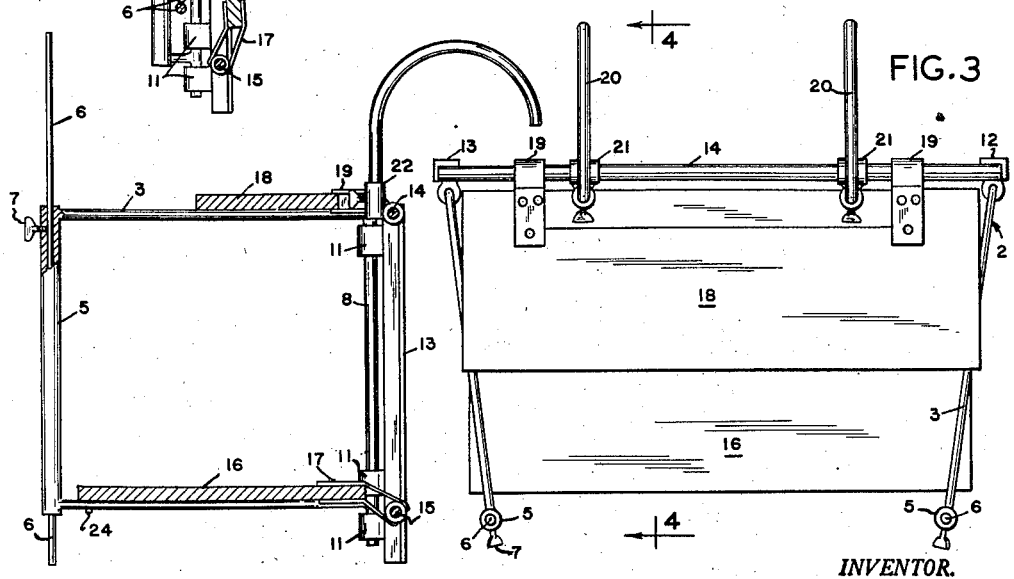
Figure 3 is a top plan view taken along the line 3—3 of Figure 2.
Figure 4:
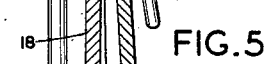
Figure 4 is a sectional end view taken along the line 4—4 of Figure 3

From the foregoing it will be apparent that the device can be conveniently made ready for use and attachment to a tire of a vehicle from the collapsed and folded position shown in Figure 5 to the expanded position shown in Figure 1 by merely placing the hook elements 20 over the top of the tire and then spreading them relative to each other and to the circumference of the tire to thereby locate the back frame, side frames 1 and 2 and hence the steps 16 and 18 at the desired elevation. The hook elements are then locked in position on the cross member 14 by the thumbscrews 23. Following this the frame members 1 and 2 are spread outwardly away from each other to allow the steps 16 and 18 to be swung upwardly into horizontal positions as shown in Figures 1, 2 and 4. The frame members 5 are then swung inwardly toward each other as shown in Figures 1 and 5 until their cross members 4 and 3 underlie their respective steps 16 and 18 to provide solid supports therefor. When in a supported position it will be noted that the bottom step 16 extends forwardly from the rear frame substantially the length of its supporting cross members 4 while the top step 18 extends forwardly a lesser distance.

For maintaining the steps in a horizontal position and at right angles to any size wheel or tire to which the device is attached, the legs 6 are allowed to gravitate through the hollow posts 5 until they contact the floor or other supporting surface and then locked in position by thumbscrews 7. Secured to and depending from the underside of the bottom step 16 near each corner thereof is a pin 24 to serve as limit stops to prevent any spreading or outward swinging of the frames 1 and 2, which, of course, would allow the steps to fall from a horizontal position.

While I have shown a particular form of embodiment of my invention I am aware that many minor changes therein will readily suggest themselves to others skilled in the art without departing from the spirit and scope of the invention. Having thus described my invention what I claim as new and desire to protect by Letters Patent is:

An adjustable and collapsible mechanic's step comprising in combination a rear frame comprising vertical side members interconnected at their top and bottom ends respectively by horizontal cross members, a pair of identical side frames each comprising hollow vertical tubular front members and vertical rear members interconnected at their top and bottom ends by horizontal cross members, a top step and a bottom step each hingedly attached to the top and bottom cross members respectively of said rear frame between said side frames and independently swingable from substantially vertical positions to horizontal positions with respect to said side and rear frames, each of said side frames being hingedly attached by its respective rear vertical member to said rear frame, a vertically adjustable supporting leg slidably mounted within said hollow vertical member of each side frame, means carried by said last mentioned vertical members for lockably engaging said supporting legs, a pair of hook members slidably, pivotally and swingably attached to said top horizontal cross member of said rear frame and adapted to be swung from a support-engaging surface to a position substantially parallel with said steps, whereby the top step may be supported in a horizontal position by the top horizontal cross members of said side frames and the bottom step may be supported in a horizontal position by the bottom horizontal cross members of the side frames when the side frames are swung toward each other, said bottom step extending forwardly from the rear frame substantially the length of said bottom horizontal cross members of the side frames when supported thereby and the top step extending forwardly a lesser distance when supported by the top horizontal cross members of the side frames, and means comprising two pins secured to and depending from said bottom step and adapted for engagement with said side frames to prevent their outward swing relative to said steps when said bottom step is in horizontal operative position atop the lower cross member of the side frames.

References Cited in the file of this patent

UNITED STATES PATENTS

| | | |
|---|---|---|
| 104,569 | Floyd | June 21, 1870 |
| 2,134,638 | Lundstrom et al. | Oct. 25, 1938 |
| 2,529,532 | Abbott et al. | Nov. 14, 1950 |
| 2,575,503 | Warren | Nov. 20, 1951 |
| 2,680,522 | Temple | June 8, 1954 |